United States Patent
Osgood et al.

(10) Patent No.: US 11,572,801 B2
(45) Date of Patent: Feb. 7, 2023

(54) TURBINE ENGINE COMPONENT WITH BAFFLE

(71) Applicant: General Electric Company, Schenectady, NY (US)

(72) Inventors: Daniel Endicott Osgood, Cincinnati, OH (US); Gregory Terrence Garay, West Chester, OH (US); Daniel Lee Durstock, Fort Wright, KY (US); Steven Robert Brassfield, Cincinnati, OH (US); Tingfan Pang, West Chester, OH (US)

(73) Assignee: General Electric Company, Schenectady, NY (US)

( * ) Notice: Subject to any disclaimer, the term of this patent is extended or adjusted under 35 U.S.C. 154(b) by 183 days.

(21) Appl. No.: 16/568,821

(22) Filed: Sep. 12, 2019

(65) Prior Publication Data

US 2021/0079808 A1   Mar. 18, 2021

(51) Int. Cl.
*F01D 25/12* (2006.01)
*F23R 3/00* (2006.01)

(52) U.S. Cl.
CPC .............. *F01D 25/12* (2013.01); *F23R 3/002* (2013.01); *F05D 2220/323* (2013.01); *F05D 2240/126* (2013.01); *F05D 2240/35* (2013.01); *F05D 2240/81* (2013.01); *F05D 2260/201* (2013.01); *F23R 2900/03042* (2013.01)

(58) Field of Classification Search
CPC ............... F01D 25/12; F23R 3/002; F23R 2900/03042; F05D 2220/323; F05D 2240/35; F05D 2240/126; F05D 2240/81; F05D 2260/201
See application file for complete search history.

(56) References Cited

U.S. PATENT DOCUMENTS

| 2,648,519 | A |   | 8/1953 | Campini |
| 3,973,874 | A |   | 8/1976 | Corsmeier et al. |
| 4,056,332 | A | * | 11/1977 | Meloni .................... F01D 5/188 416/97 A |
| 4,100,669 | A |   | 7/1978 | Pemper |
| 4,573,865 | A | * | 3/1986 | Hsia ........................ F01D 5/187 165/109.1 |
| 4,695,247 | A | * | 9/1987 | Enzaki ...................... F23R 3/06 431/352 |
| 4,798,515 | A |   | 1/1989 | Hsia et al. |
| 5,127,793 | A |   | 7/1992 | Walker et al. |
| 5,207,556 | A |   | 5/1993 | Frederick et al. |
| 5,586,866 | A | * | 12/1996 | Wettstein ................ F01D 5/189 416/96 A |
| 6,390,769 | B1 |   | 5/2002 | Burdgick et al. |
| 7,008,185 | B2 |   | 3/2006 | Peterman et al. |

(Continued)

FOREIGN PATENT DOCUMENTS

CN        107448243 A    12/2017

*Primary Examiner* — Woody A Lee, Jr.
*Assistant Examiner* — Justin A Pruitt
(74) *Attorney, Agent, or Firm* — McGarry Bair PC

(57) ABSTRACT

The disclosure relates to a component for a turbine engine with a heated airflow and a cooling airflow. The component includes a wall separating the heated airflow from the cooling airflow. The wall can have a heated surface confronting the heated airflow and a cooled surface confronting the cooling airflow. The component can also include a baffle with a set of cooling holes.

21 Claims, 10 Drawing Sheets

(56) References Cited

U.S. PATENT DOCUMENTS

| | | |
|---|---|---|
| 7,080,972 B2 * | 7/2006 | Rawlinson .............. F01D 5/187 |
| | | 416/97 R |
| 7,104,756 B2 | 9/2006 | Harding et al. |
| 8,484,943 B2 | 7/2013 | Cunha et al. |
| 8,667,682 B2 * | 3/2014 | Lee ........................ F01D 9/023 |
| | | 60/39.01 |
| 8,784,037 B2 | 7/2014 | Durocher et al. |
| 9,828,872 B2 | 11/2017 | Lacy et al. |
| 10,012,106 B2 | 7/2018 | Spangler et al. |
| 2004/0170498 A1 | 9/2004 | Peterman et al. |
| 2013/0081401 A1 * | 4/2013 | Kim ......................... F23R 3/50 |
| | | 60/752 |
| 2013/0315725 A1 | 11/2013 | Uechi et al. |
| 2015/0027657 A1 | 1/2015 | Propheter-Hinckley |
| 2016/0023275 A1 | 1/2016 | Propheter-Hinckley et al. |
| 2017/0175578 A1 | 6/2017 | Propheter-Hinckley |
| 2017/0328209 A1 | 11/2017 | Bunker |
| 2018/0371920 A1 | 12/2018 | Packer et al. |
| 2019/0153875 A1 | 5/2019 | Kreitzer et al. |
| 2021/0156262 A1 * | 5/2021 | Geisen .................... F23R 3/002 |

\* cited by examiner

TURBINE ENGINE COMPONENT WITH BAFFLE

TECHNICAL FIELD

The disclosure generally relates to cooled turbine engine components, including the use of baffles to cool such components.

BACKGROUND

Turbine engines, and particularly gas or combustion turbine engines, are rotary engines that extract energy from a flow of pressurized combusted gases passing through the engine onto rotating turbine blades.

Turbine engines are often designed to operate at high temperatures to improve engine efficiency. It can be beneficial to provide cooling measures for engine components such as airfoils in the high-temperature environment, where such cooling measures can reduce material wear on these components and provide for increased structural stability during engine operation.

BRIEF DESCRIPTION

In one aspect, the disclosure relates to a component for a turbine engine with a heated airflow and a cooling airflow. The component includes a wall separating the heated airflow from the cooling airflow and having a heated surface confronting the heated airflow and a cooled surface confronting the cooling airflow, a first baffle having a first wall connected to the cooled surface and defining a first chamber, with a first set of cooling holes extending through the first wall to fluidly couple the cooling airflow to the first chamber, and a second baffle having a second wall connected to the first wall and defining a second chamber, with a second set of cooling holes extending through the second wall to fluidly couple the cooling airflow to the second chamber.

In another aspect, the disclosure relates to an airfoil assembly for a turbine engine. The airfoil assembly includes an airfoil having an outer wall separating a heated airflow from a cooling airflow and having a heated surface confronting the heated airflow and a cooled surface confronting the cooling airflow, the outer wall extending in a chord-wise direction from a leading edge to a trailing edge and in a radial direction from a root to a tip, a first baffle having a first wall connected to the cooled surface and defining a first chamber, with a first set of cooling holes extending through the first wall to fluidly couple the cooling airflow to the first chamber, and a second baffle having a second wall connected to the first wall and defining a second chamber, with a second set of cooling holes extending through the second wall to fluidly couple the cooling airflow to the second chamber.

In yet another aspect, the disclosure relates to a turbine engine, including a compressor section, combustion section, and turbine section in axial flow arrangement, and a cooled component located in one of the compressor section, combustion section, or turbine section. The cooled component includes a wall separating a heated airflow from a cooling airflow and having a heated surface confronting the heated airflow and a cooled surface confronting the cooling airflow, a first baffle having a first wall connected to the cooled surface and defining a first chamber, with a first set of cooling holes extending through the first wall to fluidly couple the cooling airflow to the first chamber, and a second baffle having a second wall connected to the first wall and defining a second chamber, with a second set of cooling holes extending through the second wall to fluidly couple the cooling airflow to the second chamber.

DESCRIPTION OF EMBODIMENTS

Figure 1:
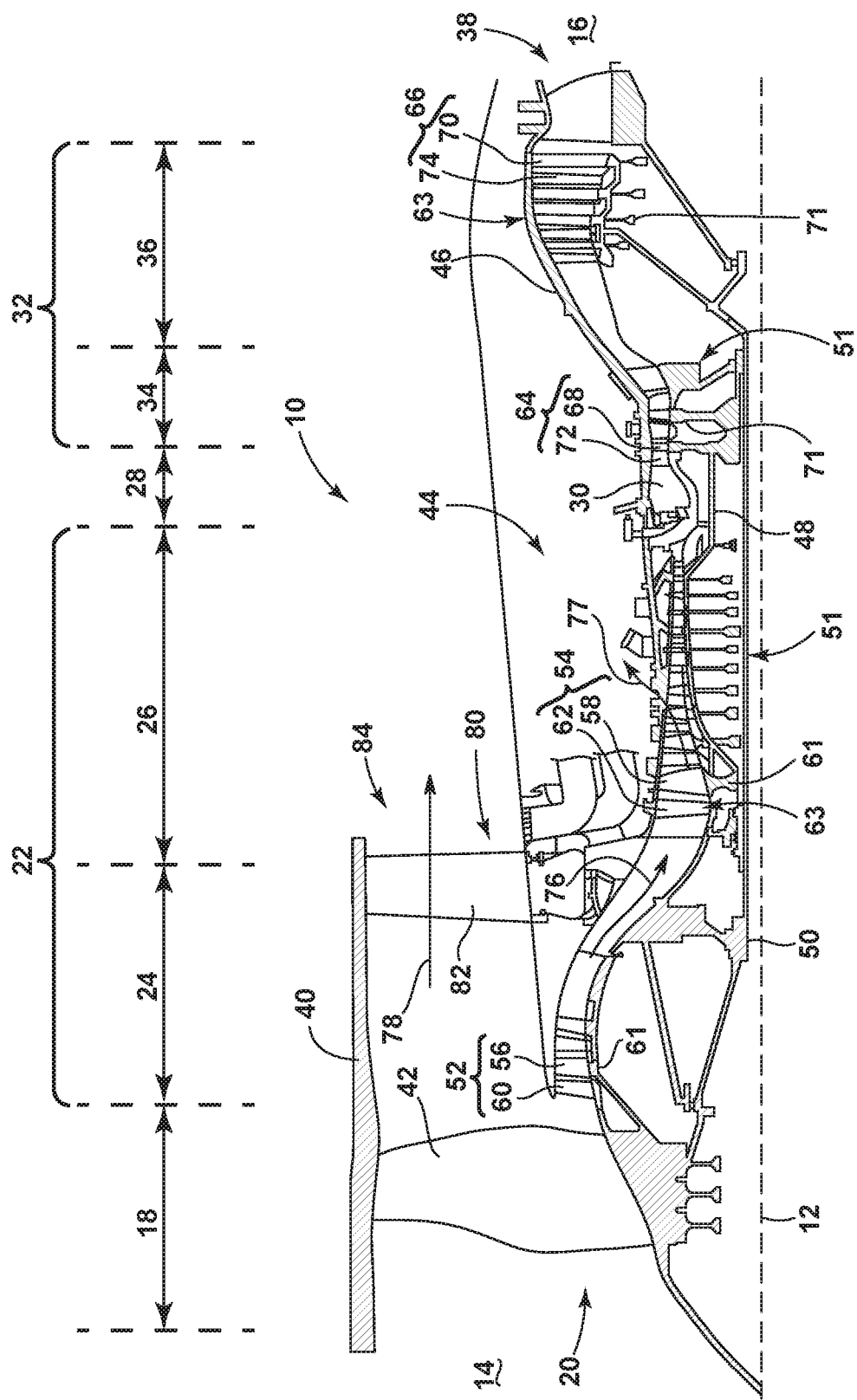
FIG. 1 is a schematic cross-sectional diagram of a turbine engine for an aircraft.

The described embodiments of the present disclosure generally relate to a baffle for a cooled component in a turbine engine. For purposes of illustration, aspects of the present disclosure will be described with respect to an airfoil assembly for an aircraft turbine engine. It will be understood, however, that the disclosure is not so limited and may have general applicability within an engine, including turbines, as well as in non-aircraft applications, such as other mobile applications and non-mobile industrial, commercial, and residential applications.

Traditionally, turbine engine airfoil assemblies can include impingement baffles that can extend substantially into the interior of the airfoil, such as extending along an entire radial length of the airfoil, for cooling purposes. Such impingement baffles are generally coupled, e.g. via brazing, to the airfoil at one radial end. During operation of the engine, the airfoil and coupled impingement baffle can thermally expand at differing rates and generate undesirable internal stresses within either or both of the airfoil and impingement baffle.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
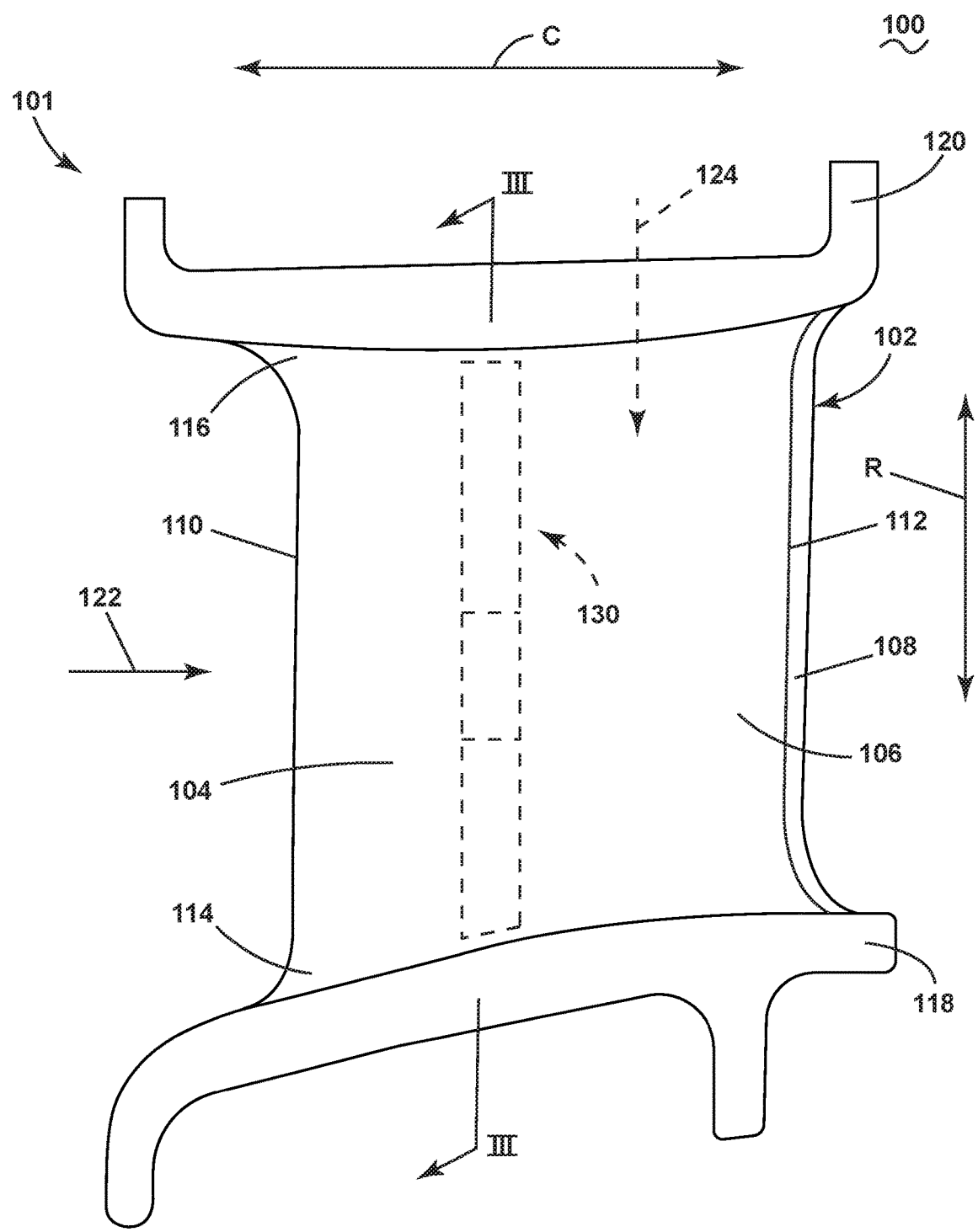
FIG. 2 is a side view of a component for the turbine engine of FIG. 1 in the form of an airfoil assembly in accordance with various aspects described herein.

Referring now to FIG. 2, one component 100 is illustrated that can be utilized in the turbine engine 10. The component 100 can be located anywhere within the turbine engine 10 including, but not limited to, the fan section 18, compressor section 22, combustor 30, or turbine section 32.

In the illustrated example, the component 100 is in the form of an airfoil assembly 101. The airfoil assembly 101 includes an airfoil 102 having an outer wall 104 defining a pressure side 106 and a suction side 108. The outer wall 104 extends in a chord-wise direction C from a leading edge 110 to a trailing edge 112, and also extends in a radial direction R from a root 114 to a tip 116. For the purposes of illustration, the airfoil 102 is in the form of a static vane, such as the HP turbine vane 72, where an inner band 118 and an outer band 120 couple to the root 114 and tip 116, respectively. It will be understood that aspects of the disclosure can have general applicability to any component within the turbine engine 10, including a rotating blade such as the HP turbine blade 68 where a platform can be coupled to the root of the airfoil, as well as having applicability for a shroud, a core casing, or the like, or combinations thereof.

The turbine engine 10 can have or generate a heated airflow 122, such as the combustion gases described above, as well as a cooling airflow 124, such as the cooling fluid or bleed air 77 described above. One exemplary heated airflow 122 and cooling airflow 124 is illustrated in FIG. 2 where the outer wall 104 separates the heated airflow 122 from the cooling airflow 124 as shown.

A set 130 of baffles can be included in the component 100. In the example shown, the set 130 of baffles can include a first baffle 131, a second baffle 132, and a third baffle 133. For example, any or all of the first, second, or third baffle 131, 132, 133 can be in the form of an impingement baffle. While three exemplary baffles 131, 132, 133 are illustrated, aspects of the disclosure can be applied to any number of baffles having any suitable size, arrangement, or pattern in the component 100. In one example, four or more baffles can be provided in a row along the radial direction R within the component 100. In another example, multiple baffles can be provided in a multi-dimensional array along the circumferential direction C and radial direction R within the component 100. In still another example, any of the baffles 131, 132, 133 can be offset with respect to one another in the chord-wise direction C. For instance, the second baffle 132 can be located radially between the first and third baffles 131, 133 and also located closer to the leading edge 110, while the first and third baffles 131, 133 can be located closer to the trailing edge 112.

In one non-limiting example, it is contemplated that the component 100 can be formed in a single piece having the airfoil 102, inner and outer bands 118, 120, and set 130 of baffles. Any suitable manufacturing method or process can be utilized to form the component 100, including casting or additive manufacturing. As used herein, an "additively manufactured" component will refer to a component formed by an additive manufacturing (AM) process, wherein the component is built layer-by-layer by successive deposition of material. AM is an appropriate name to describe the technologies that build 3D objects by adding layer-upon-layer of material, whether the material is plastic or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing, and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. It is also contemplated that a process utilized could include printing a negative of the part, either by a refractory metal, ceramic, or printing a plastic, and then using that negative to cast the component.

Figure 3:
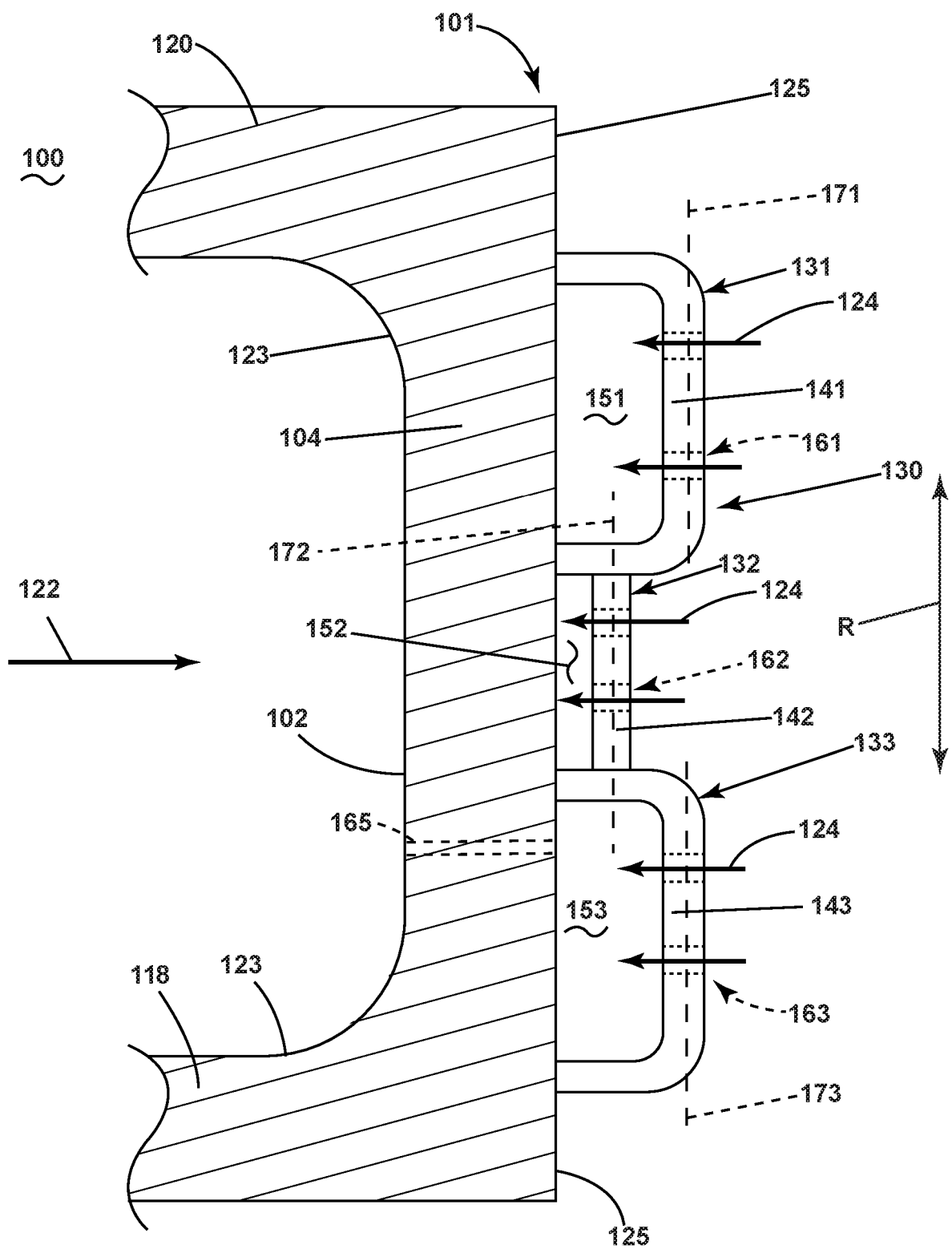
FIG. 3 is a side cross-sectional view of the airfoil assembly of FIG. 2 along line having baffles in accordance with various aspects described herein.

FIG. 3 illustrates a sectional view of the component 100. The outer wall 104 further includes a heated surface 123 confronting the heated airflow 122, as well as a cooled surface 125 confronting the cooling airflow 124 as shown. While the heated airflow 122 is illustrated perpendicular to the heated surface 123, it should be understood that the heated airflow 122 can flow in any direction proximate the heated surface 123, including parallel to the heated surface 123.

The first baffle 131 includes a first wall 141 connected to the cooled surface 125 at each end thereof and at least partially defines a first chamber 151 as shown. The first baffle 131 also includes a first set of cooling holes 161 extending through the first wall 141 to fluidly couple the cooling airflow 124 to the first chamber 151. The second and third baffles 132, 133 include respective second and third walls 142, 143 at least partially defining second and third chambers 152, 153 as shown. A second and third set of cooling holes 162, 163 extend through the respective second and third walls 142, 143 to fluidly couple the cooling airflow 124 to the respective second and third chambers 152, 153. It is contemplated that any or all of the first, second, or third sets of cooling holes 161, 162, 163 include impingement cooling holes. It is further contemplated that at least one hole 165 can extend through the component 100 between the heated and cooled surfaces 123, 125. In such a case, the at least one hole 165 can provide for film cooling, bore cooling, or other cooling effects for the outer wall 104. It will be understood that the at least one hole 165 can be provided anywhere within the component 100, and can also be fluidly coupled to any or all of the chambers 151, 152, 153.

In the example shown, the third baffle 133 is spaced from the first baffle 131. The second wall 142 of the second baffle 132 is connected at each end thereof to each of the first and third walls 141, 143 of the respective first and third baffles 131, 133 to define the second chamber 152. The first and third walls 141, 143 are connected directly to the cooled surface 125 at each end thereof to define the respective first and third chambers 151, 153 as shown.

In addition, at least a portion of each of the first, second, and third walls 141, 142, 143 can define respective first, second, and third planes 171, 172, 173. It is contemplated that the second plane 172 can be distinct from the first plane 171. In the example of FIG. 3, the second plane 172 is parallel to the first plane 171 as well as the third plane 173. In this manner, one baffle in the set 130 of baffles can be "out of plane" with another baffle in the set 130 of baffles. Any geometric profile is contemplated for the baffles 131, 132, 133, including flat, curvilinear, asymmetric or irregular, or the like.

In addition, any portion of the first, second, or third walls 141, 142, 143 can be parallel to the cooled surface 125. More specifically, any or all of the first, second, or third planes 171, 172, 173 can be parallel to the cooled surface 125 as shown in the example of FIG. 3. It should be understood that any number of baffle walls, including two or more, can be parallel to the cooled surface 125.

The cooled surface 125 can further include a curvilinear geometry, such as for a curved airfoil 102. In such a case, any of the walls 141, 142, 143 can be parallel to the curvilinear geometry such that the respective baffles 131, 132, 133 form the same geometric profile as the cooled surface 125.

During operation, the cooling airflow 124 can flow through the component 100 and enter the first, second, and third chambers 151, 152, 153 via the respective sets of cooling holes 161, 162, 163. The cooling airflow 124 can impinge the cooled surface 125, thereby providing cooling for the outer wall 104. Optionally, the cooling airflow 124 can also flow through the at least one hole 165 and provide additional cooling for the outer wall 104.

In addition, during operation, the component 100 can undergo thermal expansion e.g. in the radial direction R. More specifically, the outer wall 104 and each of the baffles 131, 132, 133 can undergo thermal expansion at least in the radial direction R. A rate of thermal expansion can be the same or different between the outer wall 104 and any of the baffles 131, 132, 133. Each of the multiple, radially-arranged baffles 131, 132, 133 can undergo a smaller radial thermal expansion as compared to a traditional baffle extending fully along the outer wall 104 between the inner and outer bands 118, 120. It can be appreciated that such a smaller thermal expansion for each of the baffles 131, 132, 133 can reduce internal stresses within the component 100 during operation.

Figure 4:
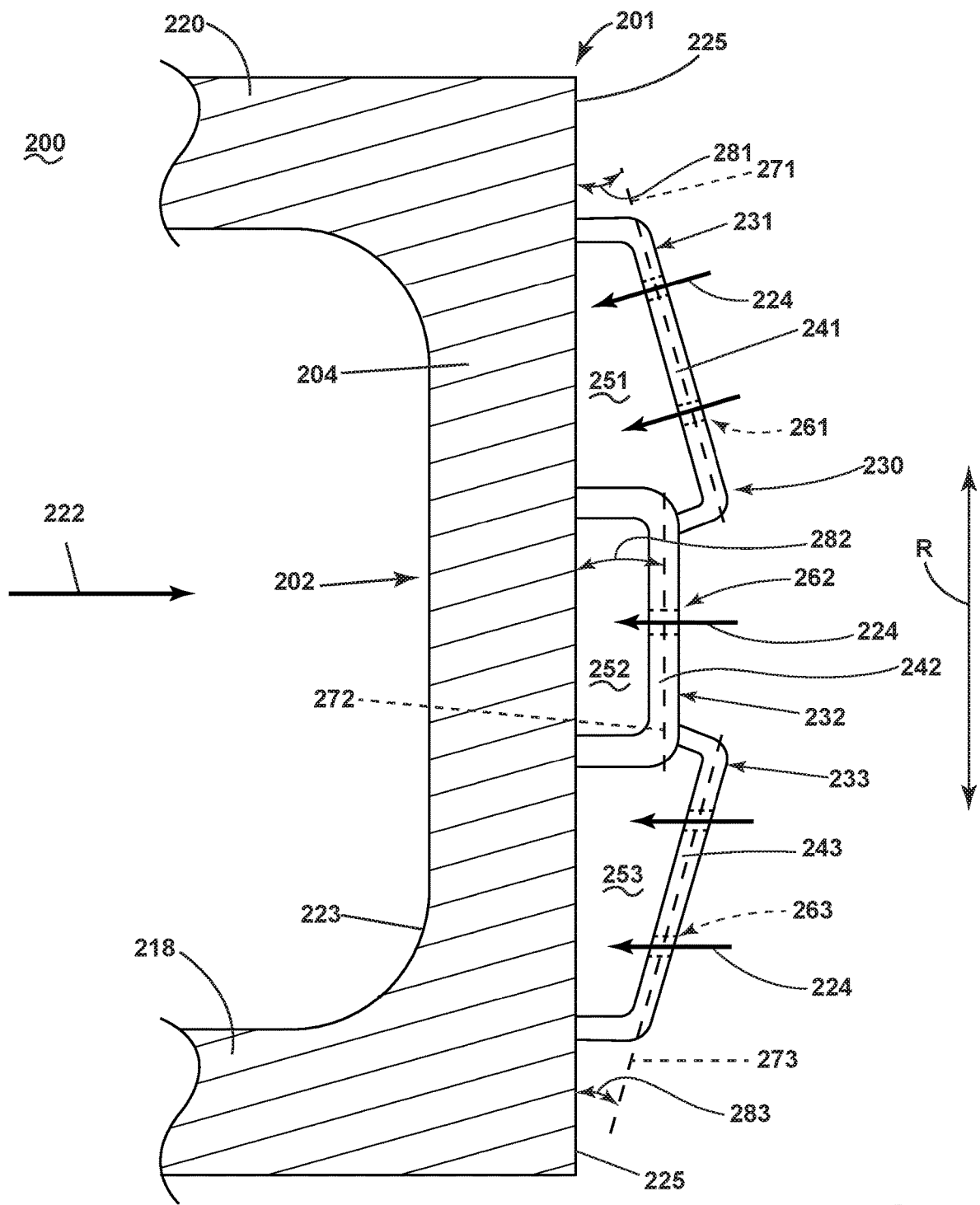
FIG. 4 is a side cross-sectional view of another component that can be utilized in the turbine engine of FIG. 1 having baffles in accordance with various aspects described herein.

Referring now to FIG. 4, another component 200 is illustrated that can be utilized in the turbine engine 10 of FIG. 1. The component 200 is similar to the component 100; therefore, like parts will be identified with like numerals increased by 100, with it being understood that the description of the like parts of the component 100 applies to the component 200, except where noted.

The component 200 can be in the form of another airfoil assembly 201 with an airfoil 202, such as a static vane, having an outer wall 204 extending between an inner band 218 and outer band 220 as described above. The outer wall 204 can separate a heated airflow 222 from a cooling airflow 224, with a heated surface 223 confronting the heated airflow 222 and a cooled surface 225 confronting the cooling airflow 224. The component 200 can also include a set 230 of baffles, illustrated with a first baffle 231, a second baffle 232, and a third baffle 233. The set 230 of baffles can include any number of baffles, including one, two, or more, and arranged in any direction or pattern as described above.

In the example shown, the first, second, and third baffles 231, 232, 233 include respective first, second, and third walls 241, 242, 243 at least partially defining respective first, second, and third chambers 251, 252, 253 and having respective first, second, and third sets of cooling holes 261, 262, 263 as described above. In addition, the first, second, and third walls 241, 242, 243 define respective first, second, and third planes 271, 272, 273.

One difference compared to the component 100 is that the first plane 271 defines a first angle 281 with the cooled surface 225 as shown. For example, the first angle 281 can be an acute angle. In addition, the second plane 272 can define a second angle 282 with the cooled surface 225. The second angle 282 can be different from the first angle 281. In a non-limiting example, the second angle 282 can be 0 degrees such that the second plane 272 is parallel to the cooled surface 225, while the first angle 281 can be 45 degrees. Any of the first, second, and third angles 281, 282, 283 can be an acute angle with the cooled surface 225. In this manner, at least one of the first wall 241, second wall 242, or third wall 243 can define an acute angle with the cooled surface 225.

The third plane 273 can also define a third angle 283 with the cooled surface 225. In the example shown, the third wall 243 is tilted in an opposite direction compared with the first wall 341, such that the first angle 281 is positive while the third angle 283 is negative.

Another difference compared to the component 100 is that any of the sets of cooling holes 261, 262, 263 can be formed at a non-orthogonal angle to the cooled surface 225 to provide for selective directional impingement of cooling air onto the cooled surface 225. In the example shown, the first set of cooling holes 261 is formed orthogonally to the first plane 271 and non-orthogonally to the cooled surface 225. In addition, the third set of cooling holes 263 is formed non-orthogonally to the third plane 273 and orthogonally to the cooled surface 225. It will be understood that the sets of cooling holes 261, 262, 263 can be formed having any suitable angle, including orthogonal to the cooled surface 225 or non-orthogonal to the cooled surface 225. In addition, angles of individual cooling holes can vary within a set of cooling holes 261, 262, 263. It is contemplated that cooling holes can be formed in the baffles 231, 232, 233 having a variety of angles with the cooled surface 225, including in a uniform or non-uniform pattern or arrangement.

It is also contemplated that the first and third baffles 231, 233 can form a "piggy-back" arrangement with the second baffle 232. As used herein, a "piggy-back" arrangement for two baffles will be used to describe the wall of one baffle coupling to both an attachment surface and the wall of another baffle. In the example of FIG. 4, the first wall 241 couples to both the second wall 242 as well as the cooled surface 225, forming a piggy-back arrangement for the first and second baffles 231, 232. In addition, the third wall 243 couples to both the second wall 242 and the cooled surface 225, forming a piggy-back arrangement for the second and third baffles 232, 233.

During operation, cooling air 224 can flow through the first, second, and third sets of cooling holes 261, 262, 263 and enter the respective first, second, and third chambers 251, 252, 253. Cooling air 224 in the first chamber 251 can impinge the cooled surface 225 at a non-orthogonal angle due to the direction of the first set of cooling holes 261 as described above. Cooling air 224 in the second and third chambers 252, 253 can impinge the cooled surface 225 at an orthogonal angle due to the direction of the respective second and third sets of cooling holes 262, 263 as described above. In this manner, the component 200 in the environment of the heated airflow 222 can be cooled by the cooling air 224 as shown.

Figure 5:
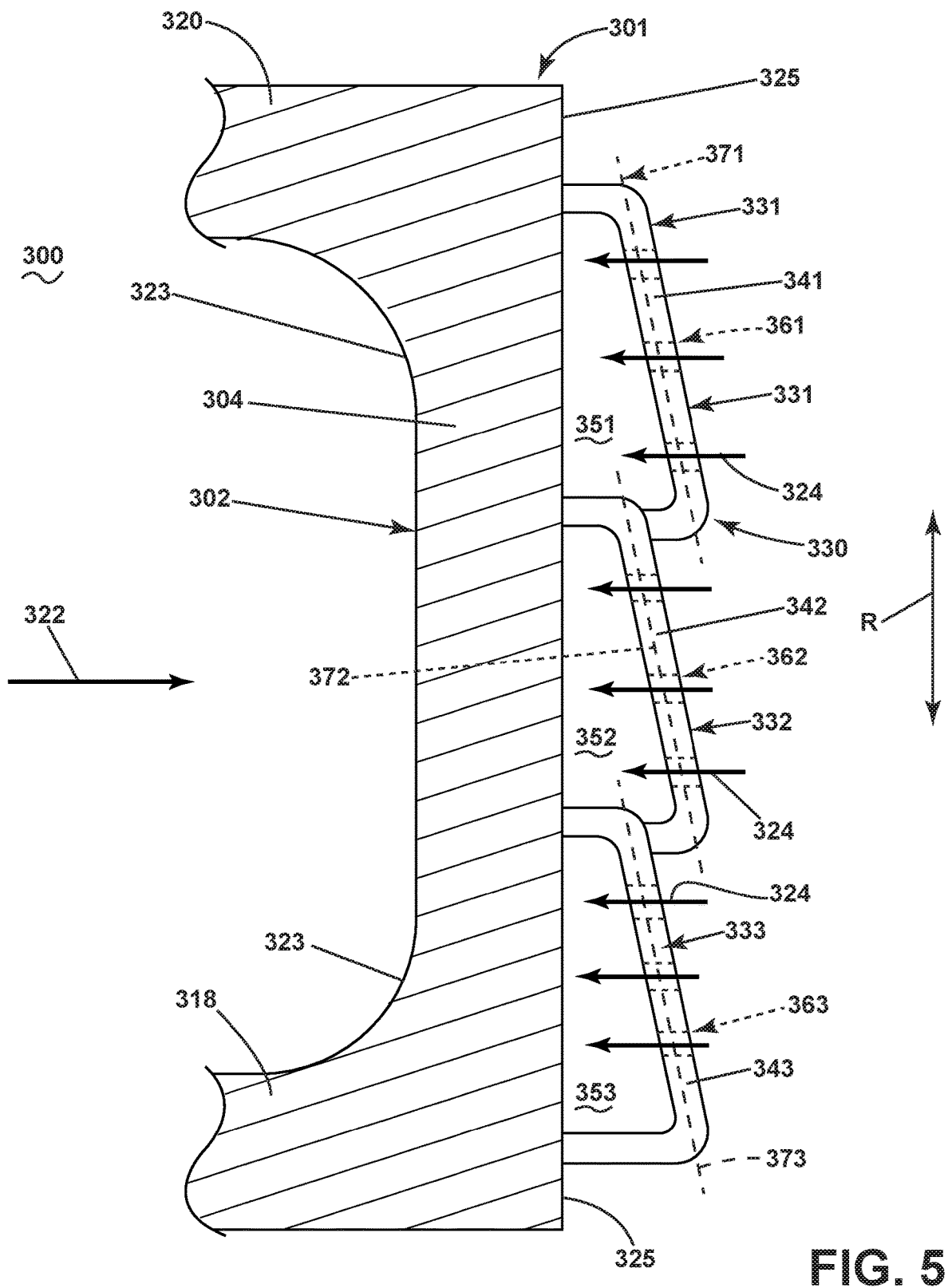
FIG. 5 is a side cross-sectional view of another component that can be utilized in the turbine engine of FIG. 1 having baffles in accordance with various aspects described herein.

Turning to FIG. 5, another component 300 is illustrated that can be utilized in the turbine engine 10 of FIG. 1. The component 300 is similar to the component 100, 200; therefore, like parts will be identified with like numerals further increased by 100, with it being understood that the description of the like parts of the component 100, 200 applies to the component 300, except where noted.

The component 300 can be in the form of another airfoil assembly 301 with an airfoil 302, such as a static vane, having an outer wall 304 extending between an inner band 318 and outer band 320 as described above. The outer wall 304 can separate a heated airflow 322 from a cooling airflow 324, with a heated surface 323 confronting the heated airflow 322 and a cooled surface 325 confronting the cooling airflow 324. The component 300 can also include a set 330 of baffles, illustrated with a first baffle 331, a second baffle 332, and a third baffle 333. The set 330 of baffles can include any number of baffles, including one, two, or more, and arranged in any direction or pattern as described above.

In the example shown, the first, second, and third baffles 331, 332, 333 include respective first, second, and third walls 341, 342, 343 at least partially defining respective first, second, and third chambers 351, 352, 353 and having respective first, second, and third sets of cooling holes 361, 362, 363 as described above. In addition, the first, second, and third walls 341, 342, 343 define respective first, second, and third planes 371, 372, 373.

One difference compared to the components 100, 200 is that all of the baffles 331, 332, 333 can be in a piggy-back arrangement. More specifically, the first wall 341 is coupled to the cooled surface 325 and the second wall 342 at each end, the second wall 342 is coupled to the cooled surface 325 and the third wall 343 at each end as well as to the first wall 341, and the third wall is coupled to the cooled surface 325 at each end as well as to the second wall 342 as shown.

Each of the first, second, and third walls 341, 342, 343 can also define respective first, second, and third planes 371, 372, 373 as shown. Another difference compared to the components 100, 200 is that each of the planes 371, 372, 373 can be parallel to one another as well as define an acute angle with respect to the cooled surface 325.

During operation, cooling air 324 can flow through the first, second, and third sets of cooling holes 361, 362, 363 and enter the respective first, second, and third chambers 351, 352, 353, and impinge the cooled surface 325. In this manner, the component 300 in the environment of the heated airflow 322 can be cooled by the cooling airflow 324 as shown.

Figure 6:
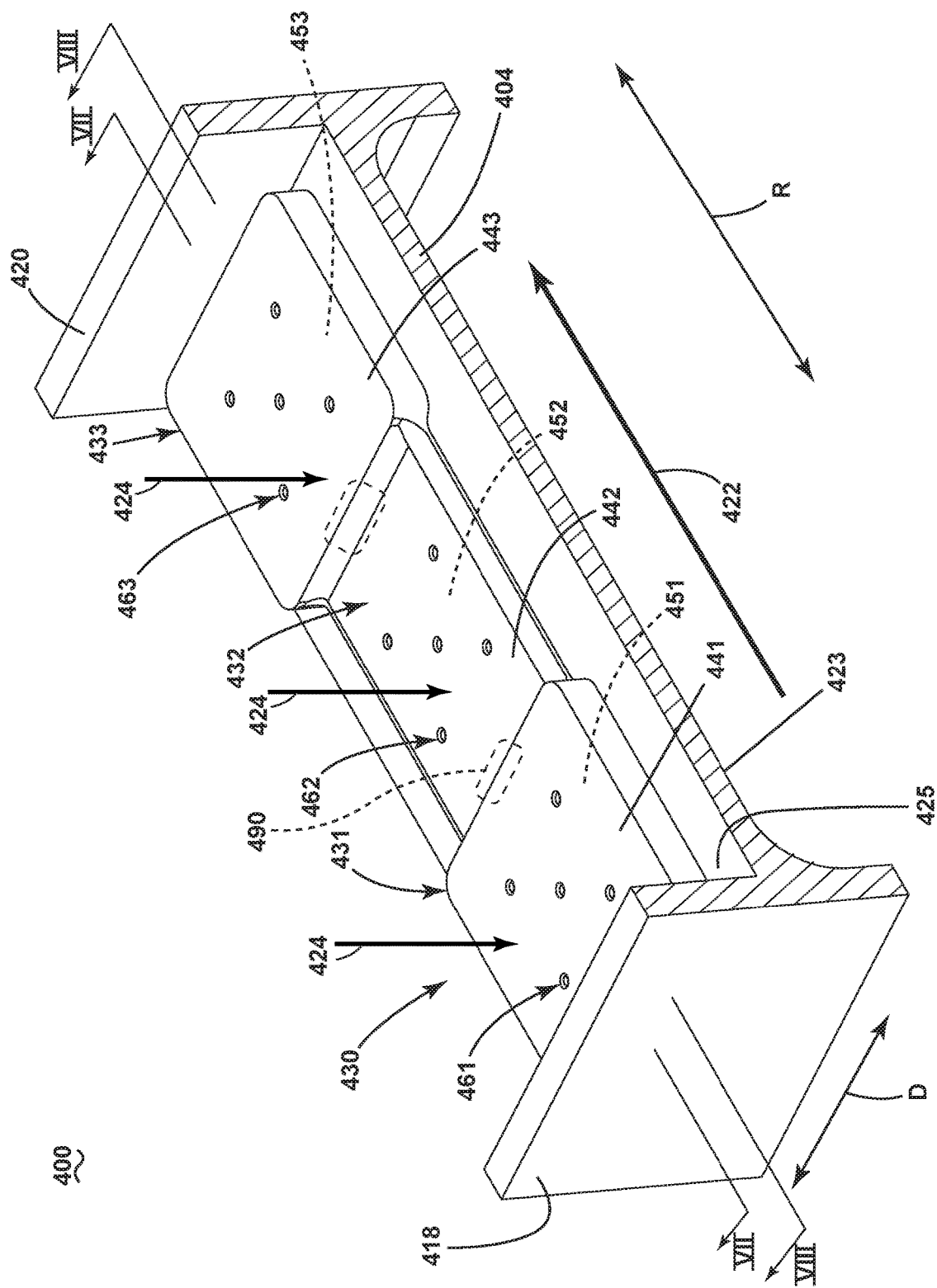
FIG. 6 is a perspective view of another component that can be utilized in the turbine engine of FIG. 1 having baffles in accordance with various aspects described herein.

Referring now to FIG. 6, another component 400 is illustrated that can be utilized in the turbine engine 10 of FIG. 1. The component 400 is similar to the component 100, 200, 300; therefore, like parts will be identified with like numerals further increased by 100, with it being understood that the description of the like parts of the component 100, 200, 300 applies to the component 400, except where noted.

The component 400 is illustrated in a schematic perspective view and includes a wall 404 separating a heated airflow 422 from a cooling airflow 424, with a heated surface 423 confronting the heated airflow 422 and a cooled surface 425 confronting the cooling airflow 424. In one example, the component 400 can form an airfoil assembly similar to the airfoil assemblies 101, 201. In such a case, the wall 404 can be a portion of an airfoil similar to the airfoil 102, 202, 302, and the endwalls 418, 420 can be similar to the respective inner bands 118, 218, 318 and outer band 120, 220, 320. Additionally or alternatively, the component 400 can form any turbine engine component having a temperature gradient formed by heated and cooled airflows 422, 424. For example, the component 400 can be included in the core casing 46, the combustor 30, or the exhaust section 38, in non-limiting examples.

The component 400 can also include a set 430 of baffles, illustrated with a first baffle 431, a second baffle 432, and a third baffle 433. In the example shown, the first, second, and third baffles 431, 432, 433 include respective first, second, and third walls 441, 442, 443 having respective first, second, and third sets of cooling holes 461, 462, 463 as shown. The set 430 of baffles can include any number of baffles, including one, two, or more, and arranged in any direction or pattern as described above.

While the second baffle 432 is illustrated as being aligned in the radial direction R between the first and third baffles 431, 433, it is also contemplated that the second baffle 432 can also be offset in a direction D perpendicular to the radial direction R in a manner similar to that described in FIG. 2. In addition, in the example shown, the first and third baffles 431, 433 do not extend to the respective endwalls 418, 420. It is contemplated that any baffle of the component 400 can extend or be coupled to either of the endwalls 418, 420, such as one end of a baffle wall coupling to one of the endwalls 418, 420.

First, second, and third chambers 451, 452, 453 are defined by the respective first, second, and third baffles 431, 432, 433 as described above. In the example shown, an aperture 490 is provided between the first chamber 451 and second chamber 452. Another aperture 490 is provided between the second chamber 452 and third chamber 453.

Figure 7:
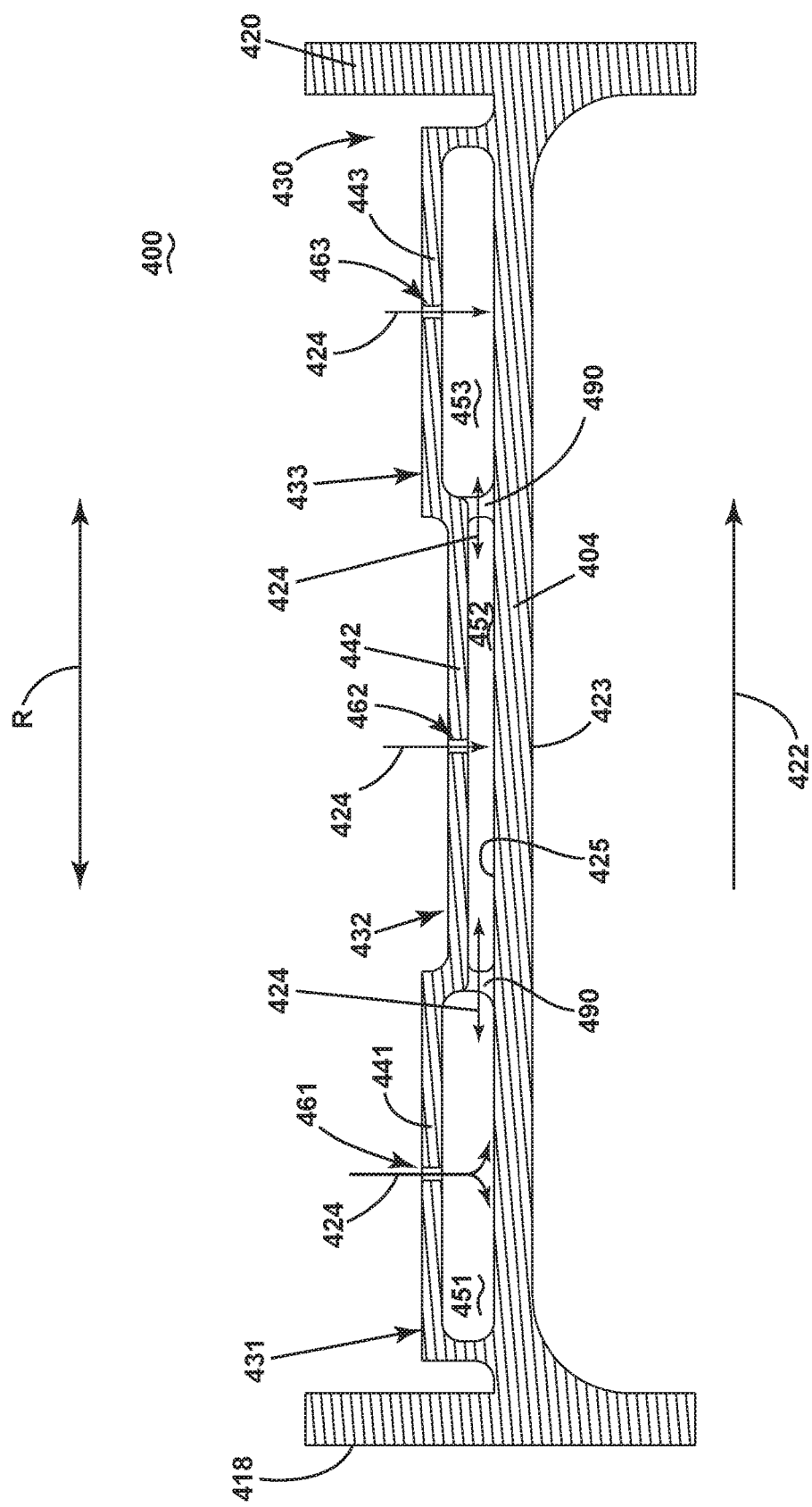
FIG. 7 is a cross-sectional view of the component of FIG. 6 along line VII-VII illustrating fluidly-coupled chambers.

FIG. 7 illustrates another cross-sectional view of the component 400 of FIG. 6 along line VII-VII. The apertures 490 provide for fluid coupling of the first chamber 451 to the second chamber 452, as well as for fluid coupling of the second chamber 452 to the third chamber 453. Any number of apertures 490 can be provided. In another non-limiting example (not shown), the second chamber 452 can be fluidly isolated from the third chamber 453 and also fluidly coupled to the first chamber 451 via an aperture 490.

Cooling air 424 can enter the first, second, and third chambers 451, 452, 453 and impinge the cooled surface 425. Cooling air 424 can also flow between any or all of the chambers 451, 452, 453 via the apertures 490. It will be understood that the cooling air 424 can move in any direction through the apertures 490 depending on a variety of factors including a relative number of cooling holes in each set 461, 462, 463, a relative size, shape, or volume of the chambers 451, 452, 453, or the like, or a combination thereof.

Figure 8:
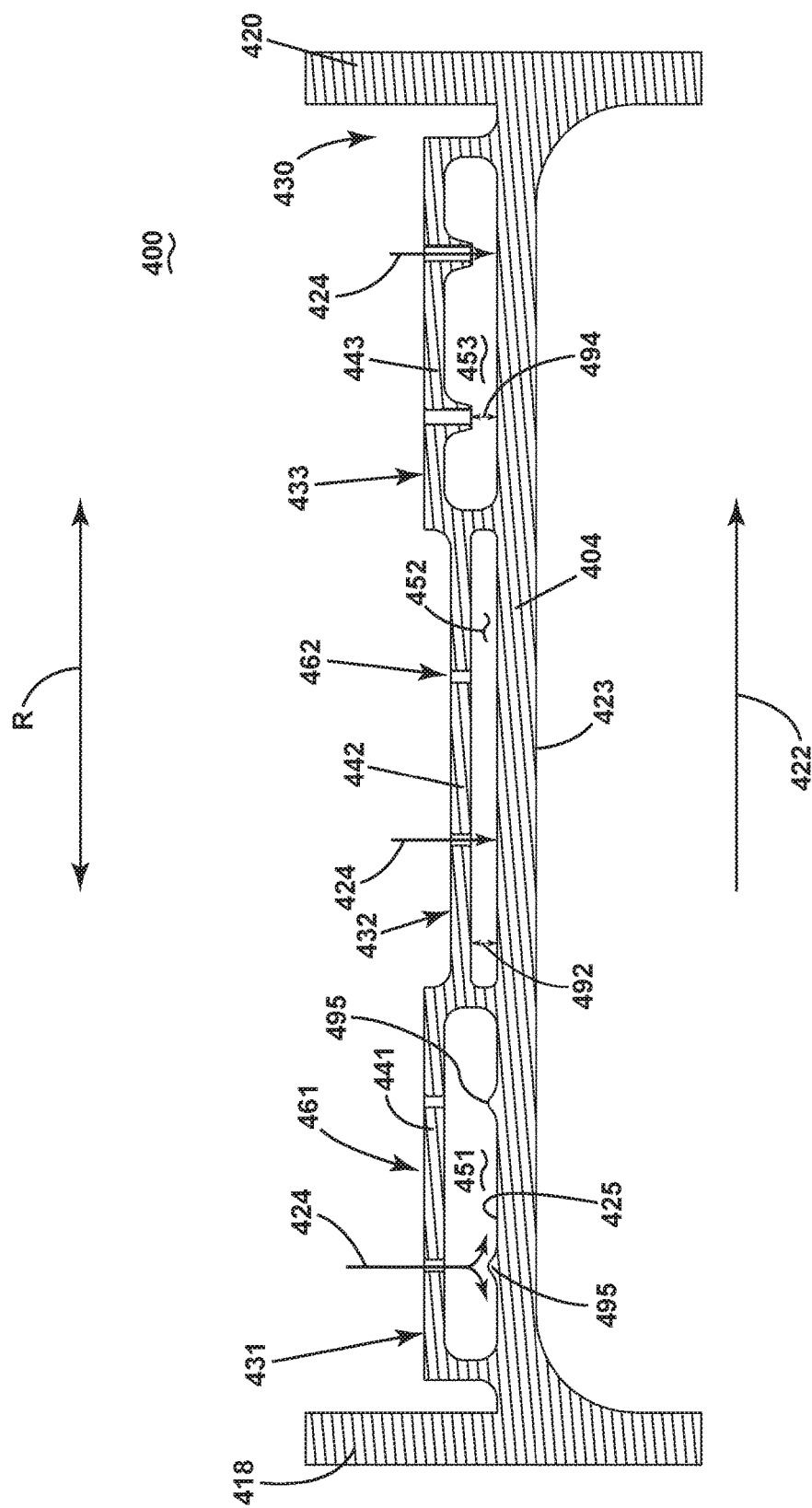
FIG. 8 is a cross-sectional view of the component of FIG. 6 along line VIII-VIII illustrating surface features and sets of cooling holes.

FIG. 8 illustrates another cross-sectional view of the component 400 of FIG. 6 along line VIII-VIII. It should be understood that the apertures 490 of FIG. 7 are not visible in this sectional view.

Another difference compared to the components 100, 200, 300 is that some cooling holes in the component 400 can be formed with a constant or variable distance from the cooled surface 425. In the illustrated example, some cooling holes in the second set of cooling holes 462 form a first distance 492 with respect to the cooled surface 425 as shown. Other cooling holes in the third set of cooling holes 463 are formed with a second distance 494 with respect to the cooled surface 425, even as the third wall 443 is in a different plane compared to the second wall 442. The third wall 443 can be formed with additional material, either across the entire third wall 443 or locally adjacent each cooling hole in the third set 463, such that the first and second distances 492, 494 are equal. In this manner, any of the first, second, or third baffles 431, 432, 433 can have a varied wall thickness in the first, second, or third walls 441, 442, 443. In one example, such a varied wall thickness can be in the form of a locally-thickened region e.g. proximate the third set of cooling holes 463 forming the second distance 494. In addition, such a varied wall thickness can be formed as a continuously varying or a non-continuously varying wall thickness.

In this manner, the cooled airflow 424 can impinge the cooled surface 425 within the second and third chambers 452, 453 having traversed equal distances from each set of cooling holes 462, 463 and the cooled surface 425.

Another difference compared to the components 100, 200, 300 is that a surface feature 495 can be included in the cooled surface 425. In the example shown, the surface feature 495 is in the form of a bump or protrusion confronting a cooling hole in the first set of cooling holes 461. Additionally or alternatively, the surface feature 495 can also include a pin, chevron, surface roughness, surface grooves, or a heat transfer augmentation structure, in non-limiting examples. The surface feature 495 can be of any size or shape along the cooled surface 425, including covering the entire cooled surface 425 within a chamber 451, 452, 453. During operation, the cooling airflow 424 can enter the first chamber 451, impinge the surface feature 495, and divide or move along the cooled surface 425. For example, the cooling airflow 424 can impinge a surface feature 495 as well as move between the chambers 451, 452, 453 (FIG. 7).

Figure 9:
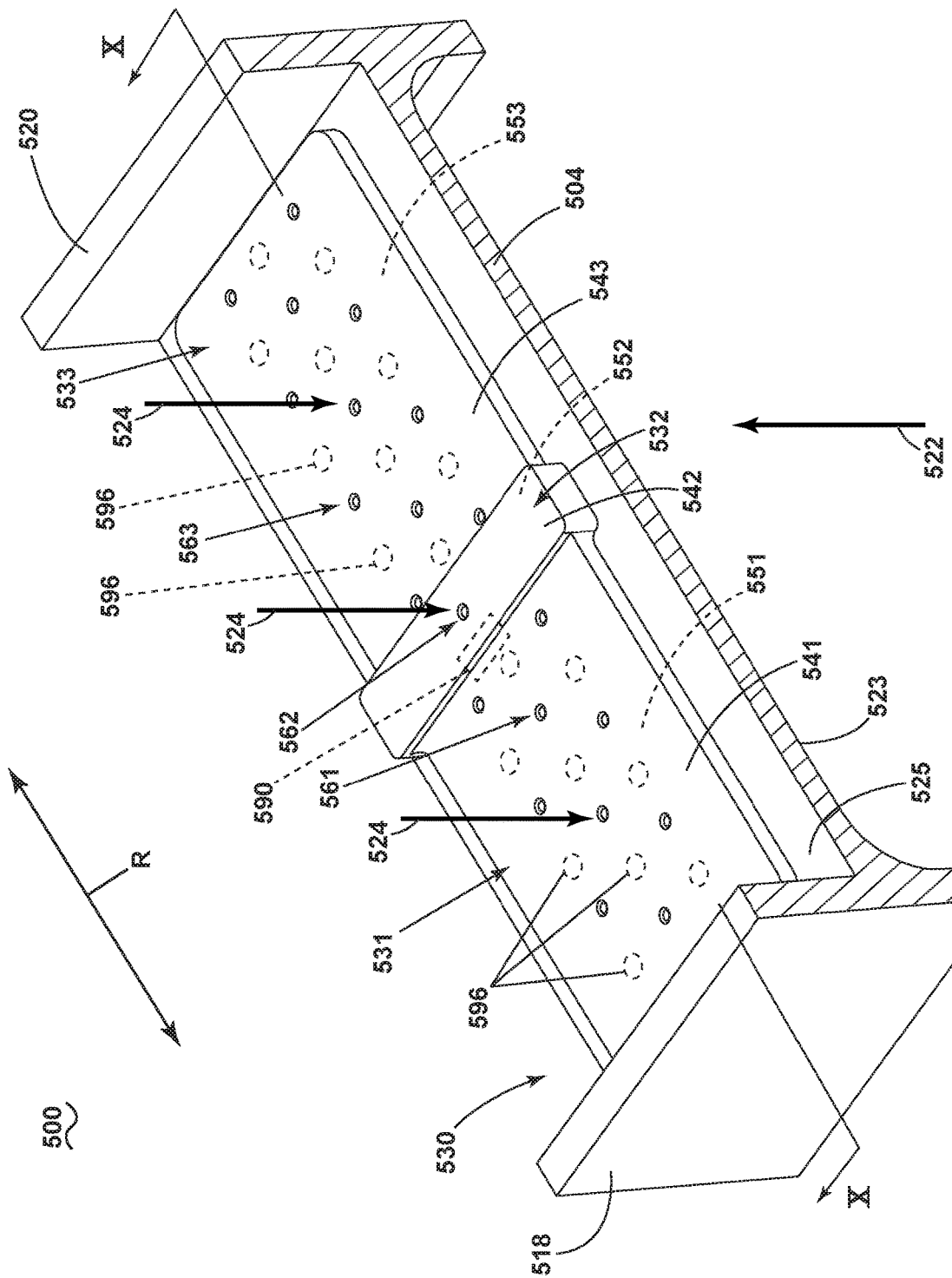
FIG. 9 is a perspective view of another component that can be utilized in the turbine engine of FIG. 1 having baffles in accordance with various aspects described herein.

Referring now to FIG. 9, another component 500 is illustrated that can be utilized in the turbine engine 10 of FIG. 1. The component 500 is similar to the component 100, 200, 300, 400; therefore, like parts will be identified with like numerals further increased by 100, with it being understood that the description of the like parts of the component 100, 200, 300, 400 applies to the component 500, except where noted.

The component 500 is illustrated in a schematic perspective view and includes a wall 504 separating a heated airflow 522 from a cooling airflow 524, with a heated surface 523 confronting the heated airflow 522 and a cooled surface 525 confronting the cooling airflow 524. In one example, the component 500 can form an airfoil assembly similar to the airfoil assemblies 101, 201, 301. In such a case, the wall 504 can be a portion of an airfoil similar to the airfoil 102, 202, 302, and the endwalls 518, 520 can be similar to the respective inner bands 118, 218, 318 and outer band 120, 220, 320. Additionally or alternatively, the component 500 can form any turbine engine component having a temperature gradient formed by heated and cooled airflows 522, 524. For example, the component 500 can be included in the core casing 46, the combustor 30, or the exhaust section 38, in non-limiting examples.

The component 500 can also include a set 530 of baffles, illustrated with a first baffle 531, a second baffle 532, and a third baffle 533. In the example shown, the first, second, and third baffles 531, 532, 533 include respective first, second, and third walls 541, 542, 543 having respective first, second, and third sets of cooling holes 561, 562, 563 as shown. The set 530 of baffles can include any number of baffles, including one, two, or more, and arranged in any direction or pattern as described above.

First, second, and third chambers 551, 552, 553 are defined by the respective first, second, and third baffles 531, 532, 533 as described above. In the example shown, an aperture 590 is provided between the first chamber 551 and second chamber 552. The third chamber 553 can be fluidly isolated from the second chamber 552.

One difference compared to the component 100, 200, 300, 400 is that at least one pin 596 can be provided extending between the cooled surface 525 and at least one of the first baffle 531, second baffle 532, or third baffle 533. In the illustrated example, multiple pins 596 are provided between the first baffle 531 and third baffle 533 and spaced between adjacent cooling holes in the first and third sets of cooling holes 561, 563. Any number of pins 596 in any suitable pattern can be utilized, including a single pin 596, a linear row of pins 596, an irregular or asymmetric arrangement of pins 596, or the like. In addition, pins 596 can be provided in any or all of the first, second, or third chambers 551, 552, 553.

Figure 10:
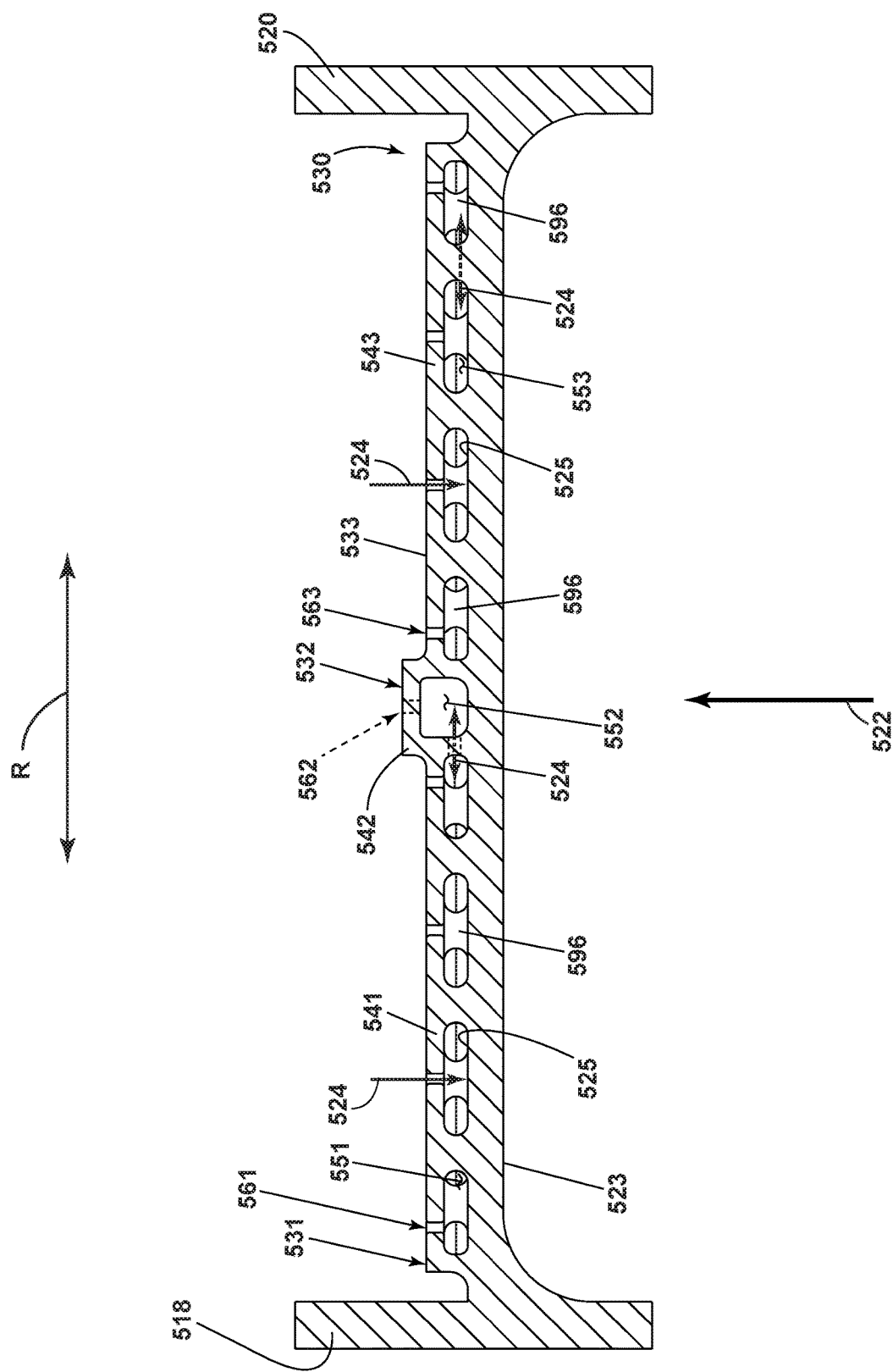
FIG. 10 is a cross-sectional view of the component of FIG. 9 along line X-X illustrating pins within the component.

FIG. 10 illustrates a cross-sectional view of the component 500 along line X-X. It should be understood that the sectional view of FIG. 10 does not cross through the second set of cooling holes 562, which is shown in phantom line.

Within each of the first and third chambers 551, 553, the pins 596 are visible both in cross-section as well as in whole. That is, for a pin 596 located in a plane offset from that defined by line X-X (FIG. 9), the entire edge of that pin 596 is visible in the view of FIG. 10.

The pins 596 can extend from the first or third walls 541, 543 to the cooled surface 525. For example, the pins 596 can provide for structural support between the first or third walls 541, 543 and the cooled surface 525.

During operation, cooling airflows 524 can enter the first, second, and third chambers 551, 552, 553 via the first, second, and third sets of cooling holes 561, 562, 563 and impinge the cooled surface 525. The aperture 590 can provide for the cooling airflow 524 to move between the first and second chambers 551, 552. In addition, the cooling airflows 524 can flow onto or around the pins 596, generating turbulence within the cooling airflows 524. In this manner, the pins 596 can provide cooling or structural support for the component 500.

Aspects of the disclosure can be combined in a variety of ways to form new aspects, including those not explicitly illustrated but are nonetheless covered by the present disclosure. Some non-limiting examples will be described below for the purposes of illustration.

In one example, a component can include a first set of baffles in a piggy-back arrangement similar to FIG. 5, with each baffle wall defining a parallel plane forming an acute angle with the cooled surface, and with pins provided in each chamber. The component can also include a second set of baffles in a similar arrangement as FIG. 3, wherein each baffle wall can be parallel to the cooled surface, and chambers in the second set of baffles can be fluidly coupled via apertures as described above.

In another example, a component can include multiple baffles extending in both radial and circumferential directions along the component wall. The multiple baffles can form corresponding multiple chambers that can be fluidly coupled or fluidly isolated based on local cooling needs for the component. The component can also include surface features as described above to further tailor the airflows impinging upon the cooled surface within the multiple baffles.

Aspects of the disclosure can provide for a variety of benefits, including that the use of multiple baffles forming multiple chambers can provide for localized or tailored cooling of a cooled turbine engine component. In addition, the use of multiple baffles can reduce internal stresses within the component wall or the baffles due to thermal expansion during engine operation, which can provide for increased component lifetimes, decreased wear, and decreased overall costs of operation. In addition, the use of multiple baffles in the component can provide for reduced stiffness and improved pliability or flexibility of the component during operation. For example, the multiple baffles can grow or thermally expand independently of one another, thereby reducing component stresses and allowing for the component to be more compliant or flexible during operation. In an example where the component and baffles are formed as a single unit, such as via additive manufacturing, aspects of the disclosure provide for reduced manufacturing costs and improved process efficiencies compared to traditional assemblies having baffles coupled via brazing or other methods.

It should be understood that application of the disclosed design is not limited to turbine engines with fan and booster sections, but is applicable to turbojets, turboshaft engines, or power generation turbines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. A component for a turbine engine with a heated airflow and a cooling airflow, the component comprising a wall separating the heated airflow from the cooling airflow and having a heated surface confronting the heated airflow and a cooled surface confronting the cooling airflow, a first baffle having a first wall connected to the cooled surface and defining a first chamber, with a first set of cooling holes extending through the first wall to fluidly couple the cooling airflow to the first chamber, and a second baffle having a second wall connected to the first wall and defining a second chamber, with a second set of cooling holes extending through the second wall to fluidly couple the cooling airflow to the second chamber.

2. The component of any preceding clause wherein the first chamber and the second chamber are fluidly coupled.

3. The component of any preceding clause wherein a portion of the first wall is parallel to the cooled surface.

4. The component of any preceding clause, further comprising a third baffle having a third wall coupled to one of the cooled surface, the first baffle, or the second baffle and defining a third chamber, with a third set of cooling holes extending through the third wall to fluidly couple the cooling airflow to the third chamber.

5. The component of any preceding clause wherein the third baffle is spaced from the first baffle, and the second baffle is coupled to the first baffle and the third baffle.

6. The component of any preceding clause wherein the first, second, and third baffles comprise impingement baffles, and wherein the first, second, and third sets of cooling holes comprise impingement holes.

7. The component of any preceding clause wherein at least two of the first baffle, the second baffle, or the third baffle are in a piggy-back arrangement.

8. The component of any preceding clause wherein at least a portion of the first wall defines a first plane, and at least a portion of the second wall defines a second plane distinct from the first plane.

9. The component of any preceding clause wherein the second plane is parallel to the first plane.

10. The component of any preceding clause wherein the first plane defines a first angle with the cooled surface.

11. The component of any preceding clause wherein the second plane defines a second angle with the cooled surface.

12. The component of any preceding clause, further comprising at least one pin extending between the cooled surface and one of the first baffle or the second baffle.

13. The component of any preceding clause wherein a cooling hole in one of the first or second sets of cooling holes comprises a protuberance extending toward the cooled surface.

14. The component of any preceding clause wherein a first distance is defined between a first cooling hole and the cooled surface, and a second distance is defined between a second cooling hole and the cooled surface.

15. The component of any preceding clause wherein the first distance is the same as the second distance.

16. An airfoil assembly for a turbine engine comprising an airfoil having an outer wall separating a heated airflow from a cooling airflow and having a heated surface confronting the heated airflow and a cooled surface confronting the cooling airflow, the outer wall extending in a chord-wise direction from a leading edge to a trailing edge and in a radial direction from a root to a tip, a first baffle having a first wall connected to the cooled surface and defining a first chamber, with a first set of cooling holes extending through the first wall to fluidly couple the cooling airflow to the first chamber, and a second baffle having a second wall connected to the first wall and defining a second chamber, with a second set of cooling holes extending through the second wall to fluidly couple the cooling airflow to the second chamber.

17. The airfoil assembly of any preceding clause wherein the airfoil assembly comprises one of a static vane or a rotating blade.

18. The airfoil assembly of any preceding clause, further comprising a third baffle having a third wall coupled to one of the cooled surface, the first baffle, or the second baffle and defining a third chamber, with a third set of cooling holes extending through the third wall to fluidly couple the cooling airflow to the third chamber.

19. The airfoil assembly of any preceding clause wherein at least two of the first baffle, the second baffle, and the third baffle are in a piggy-back arrangement.

20. The airfoil assembly of any preceding clause wherein at least one of the first wall, the second wall, or the third wall defines an acute angle with the cooled surface.

21. The airfoil assembly of any preceding clause wherein the first wall defines a first plane, and the second wall defines a second plane distinct from the first plane.

22. A turbine engine, comprising a compressor section, combustion section, and turbine section in axial flow arrangement, and a cooled component located in one of the compressor section, combustion section, or turbine section, the cooled component comprising a wall separating a heated airflow from a cooling airflow and having a heated surface confronting the heated airflow and a cooled surface confronting the cooling airflow, a first baffle having a first wall connected to the cooled surface and defining a first chamber, with a first set of cooling holes extending through the first wall to fluidly couple the cooling airflow to the first chamber, and a second baffle having a second wall connected to the first wall and defining a second chamber, with a second set of cooling holes extending through the second wall to fluidly couple the cooling airflow to the second chamber.

What is claimed is:

1. A component for a turbine engine with a heated airflow and a cooling airflow, the component comprising:
   an outer wall at least partially forming an interior space and separating the heated airflow from the cooling airflow and having a heated surface confronting the heated airflow and a cooled surface confronting the cooling airflow, with the cooling airflow located in the interior space;
   a first baffle unitarily formed with the outer wall and defining a first wall having at least a first end, with the first baffle forming a first chamber with the cooled surface;
   a second baffle unitarily formed with the outer wall and defining a second wall having at least a second end, with the second baffle forming a second chamber with the cooled surface, wherein the second end is positioned downstream of the first end with respect to the cooling airflow;
   a first set of cooling holes extending through the first wall from the first chamber to the interior space to fluidly couple the cooling airflow to the first chamber; and
   a second set of cooling holes extending through the second wall from the second chamber to the interior space to fluidly couple the cooling airflow to the second chamber.

2. The component of claim 1, wherein at least a portion of the first wall defines a first plane, and at least a portion of the second wall defines a second plane distinct from the first plane.

3. The component of claim 1, further comprising at least one pin extending between the cooled surface and one of the first baffle or the second baffle.

4. The component of claim 1, wherein a cooling hole in one of the first set of cooling holes or the second set of cooling holes comprises a protuberance extending toward the cooled surface.

5. The component of claim 1, further comprising an aperture in one of the first wall or the second wall fluidly coupling the first chamber and the second chamber.

6. The component of claim 1, further comprising:
   a third baffle defining a third wall coupled to one of the cooled surface, the first baffle, or the second baffle, the third baffle defining a third chamber with the cooled surface; and
   a third set of cooling holes extending through the third wall to fluidly couple the cooling airflow to the third chamber.

7. The component of claim 6, wherein the third baffle is spaced along the outer wall from the first baffle, and the second baffle is coupled directly between the first baffle and the third baffle.

8. The component of claim 6, wherein each of the first baffle, the second baffle, and the third baffle comprise an impingement baffle, and wherein each of the first set of cooling holes, the second set of cooling holes, and the third set of cooling holes comprise impingement holes.

9. The component of claim 1, wherein a first distance is defined between the cooled surface and a first cooling hole in the first set of cooling holes, and a second distance is defined between the cooled surface and a second cooling hole in the second set of cooling holes, wherein the first distance is different from the second distance.

10. An airfoil assembly for a turbine engine, comprising:
    an airfoil having an outer wall at least partially forming an interior space and separating a heated airflow from a cooling airflow and having a heated surface confronting the heated airflow and a cooled surface confronting the cooling airflow, with the cooling airflow located in the interior space, and with the outer wall extending in a chord-wise direction from a leading edge to a trailing edge and in a radial direction from a root to a tip;
    a first baffle unitarily formed with the outer wall and defining a first wall extending between a pair of spaced ends, with the first baffle forming a first chamber with the cooled surface;
    a second baffle unitarily formed with the outer wall and defining a second wall having at least a second end, with the second baffle forming a second chamber with the cooled surface, and wherein the second end is directly coupled to the first wall at a location between the pair of spaced ends;
    a first set of cooling holes extending through the first wall from the first chamber to the interior space to fluidly couple the cooling airflow to the first chamber; and
    a second set of cooling holes extending through the second wall from the second chamber to the interior space to fluidly couple the cooling airflow to the second chamber.

11. The airfoil assembly of claim 10, wherein the airfoil assembly comprises one of a static vane or a rotating blade.

12. The airfoil assembly of claim 10, further comprising a third baffle having a third wall coupled to one of the cooled surface, the first baffle, or the second baffle and defining a third chamber, with a third set of cooling holes extending through the third wall to fluidly couple the cooling airflow to the third chamber.

13. The airfoil assembly of claim 12 wherein at least one of the first wall, the second wall, or the third wall defines an acute angle with the cooled surface.

14. The airfoil assembly of claim 12, wherein the first wall extends along a first plane, the second wall extends along a second plane, and the third wall extends along a third plane.

15. The airfoil assembly of claim 14, further comprising an aperture in one of the first wall or the second wall, with the aperture fluidly coupling the first chamber and the second chamber.

16. The airfoil assembly of claim 14, wherein each of the first plane, the second plane, and the third plane are aligned with the outer wall.

17. The airfoil assembly of claim 14, wherein the third plane is closer to the outer wall than the first plane.

18. The airfoil assembly of claim 14, wherein the first plane defines a first angle and the second plane defines a second angle with respect to the outer wall, wherein the first angle is positive and the second angle is negative.

19. The airfoil assembly of claim 14, wherein the first plane defines a first angle and the second plane defines a second angle with respect to the outer wall, wherein the first angle is opposite the second angle.

20. The airfoil assembly of claim 14, wherein the first plane is parallel to the second plane, and the second plane is parallel to the third plane, and wherein the first plane forms an acute angle with the outer wall.

21. The airfoil assembly of claim 10, wherein the first wall defines a first plane, and the second wall defines a second plane distinct from the first plane.

\* \* \* \* \*